United States Patent [19]

Kemmler

[11] Patent Number: 4,730,502
[45] Date of Patent: Mar. 15, 1988

[54] APPARATUS FOR TRANSFERRING MECHANICAL MOTIONS REPRESENTING MEASURED QUANTITIES

[76] Inventor: Lothar Kemmler, Mozartstr. 4, Mörfelden, Fed. Rep. of Germany

[21] Appl. No.: 896,868

[22] Filed: Aug. 15, 1986

[30] Foreign Application Priority Data

Aug. 21, 1985 [DE] Fed. Rep. of Germany ....... 3529842

[51] Int. Cl.⁴ ............................................. G01D 3/08
[52] U.S. Cl. ..................... 73/866.1; 73/35; 74/DIG. 7
[58] Field of Search ................ 73/866.1, 35; 74/DIG. 7

[56] References Cited

U.S. PATENT DOCUMENTS

| 2,414,457 | 1/1947 | Eldredge et al. | 73/35 |
| 3,071,970 | 1/1963 | Barnard | 73/866.1 |
| 3,465,596 | 9/1969 | De Mair | 73/866.1 |
| 3,685,347 | 8/1972 | Hildebrandt et al. | 73/35 |
| 4,381,218 | 4/1983 | Vern | 73/35 X |
| 4,382,377 | 5/1983 | Kleinschmidt et al. | 73/35 |

FOREIGN PATENT DOCUMENTS

| 1093900 | 12/1960 | Fed. Rep. of Germany . | |
| 857833 | 8/1981 | U.S.S.R. | 73/35 |
| 958940 | 9/1982 | U.S.S.R. | 73/35 |

Primary Examiner—Tom Noland

[57] ABSTRACT

There is disclosed herein an apparatus for converting mechanical quantities, such as mechanical force, into an electrical signal by a mechanism which minimizes explosion possibilities. The mechanism includes a transmission rod which passes through a circular passageway in a wall that separates the mechanical and electrical sections of the apparatus, the transmission rod being tiltable within the passageway to transmit mechanical movement to the electrical section of the apparatus.

7 Claims, 3 Drawing Figures

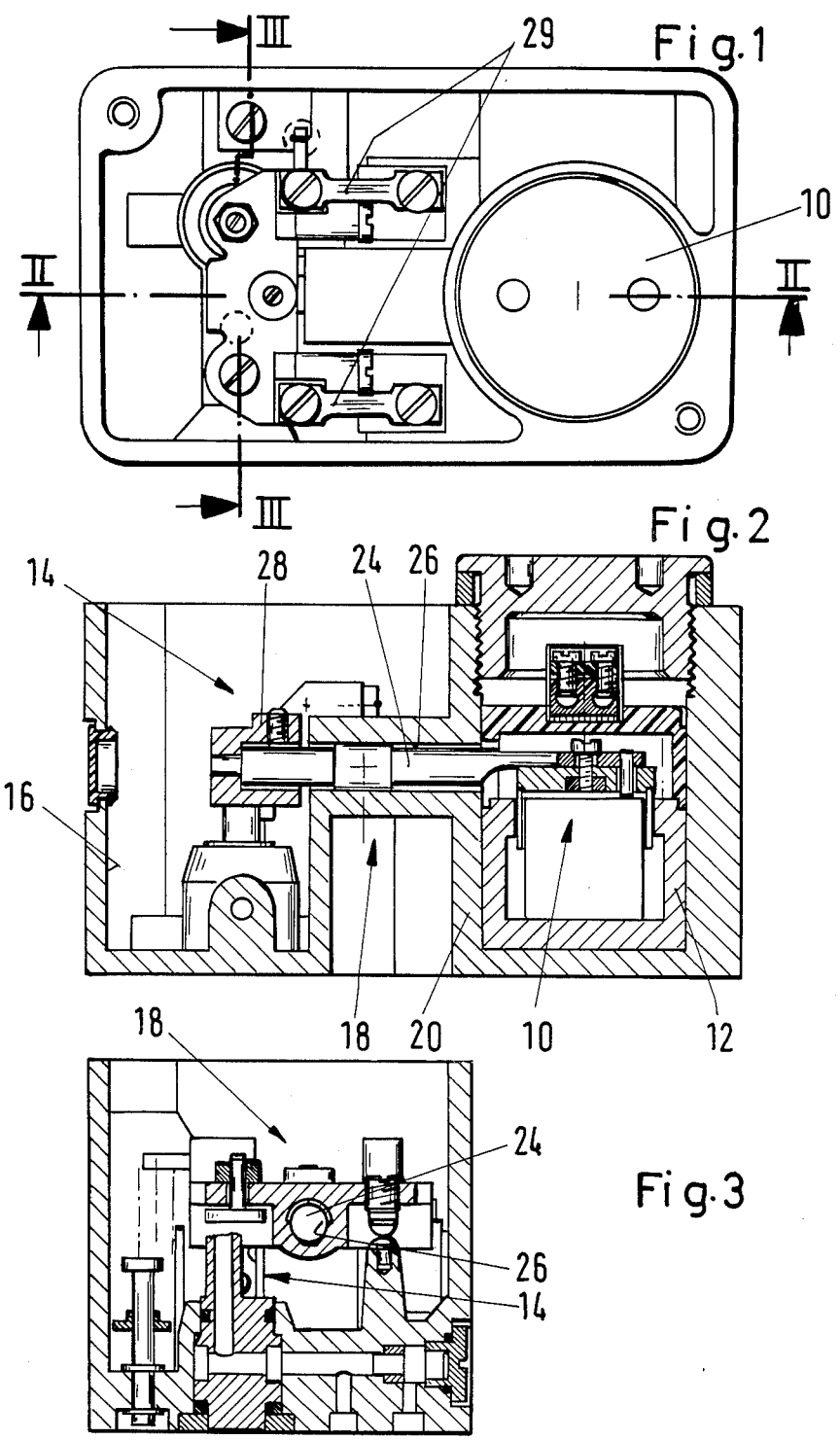

APPARATUS FOR TRANSFERRING MECHANICAL MOTIONS REPRESENTING MEASURED QUANTITIES

BACKGROUND OF THE INVENTION

The present invention relates to an apparatus for transferring mechanical movements representing measured quantities.

In industrial measuring and control technology apparatuses are frequently found within which mechanical quantities, such as a path or force, are represented by electrical quantities, such as voltage, current, resistance or conversely electrical quantities are represented by mechanical quantities. Arrangements of this type which frequently occur are e.g. electropneumatic IP or PI converters (current/pressure or pressure/current converters), electropneumatic valve positioners and the like. The electrical components for converting path quantities into electric quantities are often DMF strips, Hall generators or differential transformers. In the case where electric quantities have to be converted into a force, use is frequently made of moving coils or electromagnets, preference being given to the moving coil because it produces a force precisely proportional to the current flowing through it.

Apparatuses, instruments and equipment of the aforementioned type are frequently used in operating rooms, in which unintentionally explosive gaseous mixtures can form. Thus, the plant operator requires measures to ensure that the initial energy necessary for igniting the explosive ambient atmosphere can never form. One possible solution for this problem involves constructing the particular apparatus with maximum security, so that through the appropriate configuration of the current paths and the choice of the working voltage, it is ensured that the initial energy necessary for igniting the mixture, e.g. in the form of sparks or high surface temperatures cannot form at any point on the electrical components, such as on the moving coil or the like. Another way of achieving the desired effect is either to provide an encapsulation with protective scavenging or a pressure-tight encapsulation. Encapsulated constructions have the advantage that higher electrical energies can be used, so that it is possible to a certain extent to reduce the space requirements for the electrical components compared with the aforementioned fail-safe construction with the appropriate configuration of the current paths and the like. However, both the fail-safe construction and that with pressure encapsulation suffer from the disadvantage of bulkiness or a significant weight of the correspondingly constructed apparatus. Naturally the aforementioned problem more particularly occurs in the above-stressed explosion-proof apparatus, but fundamentally also occurs in the case of apparatuses of the more general type, where it is a question of permitting the transfer of mechanical motions from explosion-proof rooms, within which ignition energy can form in some other way than electrically, e.g. thermally or by sparking.

DE-AS No. 10 93 900 already discloses an apparatus of the aforementioned type in which there is a force or motion transmission by a longitudinally displaceable rod between the electric assembly and the mechanical assembly. This rod must be carefully adjusted within the opening or passage, so that a contact-free deflection thereof is possible. This leads to considerable mounting problems.

SUMMARY OF THE INVENTION

The problem addressed by of the present invention is to develop the apparatus of the aforementioned type that, in the case of simplified construction and simple mounting, it is possible to transfer in a completely satisfactory manner the mechanical motion.

According to the invention this problem is solved.

Unlike in the known apparatus of DE-AS No. 10 93 900, in the case of the apparatus according to the invention the transmission rod is tiltably mounted. The use of the tilting movement is particularly advantageous, because this permits in simple form a translation. The mounting and fitting are favorable, because in the deflected state of the tilting rod, it is merely necessary to tighten the fixing screws, to ensure a completely satisfactory adjustment in which no friction occurs when the rod is in the central position. Unlike in the case of the aforementioned known apparatus, no complicated adjusting means are required. It is particularly advantageous if the transmission rod, as is the object of a particularly preferred embodiment of the invention, is thickened in its central region, because in this way there is further improvement or simplification to the adjustment possibility or mounting.

The invention is based on the surprising finding that it is possible in the case of explosion-proof equipment of the aforementioned type to completely eliminate the problems occurring in the prior art by deliberately not having a general pressure encapsulation of the complete apparatus and instead combining the mechanical components on the one hand and the electrical components on the other in two separate groups, whereof only the electrical assembly has to be pressure encapsulated, with correspondingly smaller volume and weight requirements. The transfer of the necessary mechanical motion through the partition separating the two assemblies according to the inventive teaching takes place by means of the transmission rod arranged tiltably and freely movably in the passage or opening and which forms a gap connection with the inner wall of the latter and which must necessarily satisfy the corresponding standard requirements. The inventively realised transmission of the mechanical motion can be generally used for transferring in explosion-proof manner motions from and/or into a room which may develop ignition energy for an explosive ambient atmosphere. The invention is also suitable in those cases where a mechanical quantity has to be transferred from a pressure-encapsulated chamber containing electrical components into a non-pressure-encapsulated chamber or room and vice-versa.

BRIEF DESCRIPTION OF THE DRAWINGS

The invention is described in greater detail hereinafter relative to a non-limitative embodiment and the attached drawings, wherein show:

FIG. 1, an embodiment of an apparatus according to the invention with the cover removed and in plan view.

FIG. 2, a section along line II—II of FIG. 1

FIG. 3, a side view along line III—III of FIG. 1, as in FIG. 2 viewed in the direction of the arrows.

DETAILED DESCRIPTION OF THE INVENTION

In the case of the embodiment of the apparatus according to the invention shown in the drawings, a transducer with a moving coil system 10 is arranged in a first chamber 12 and forms an electrical assembly in the sense of the invention. In a second chamber 16 is located a balance beam system 18, which forms a mechanical assembly in the sense of the invention, the moving coil system 10 and balance beam system 18 are separated from one another by a partition 20. As can in particular be seen in FIG. 3, a return system 14 shown in sectional detail view therein acts on a baffle plate of the balance beam system 18 by means of compressed air and in a known manner. The torque exerted by the return system 14 on the balance beam system 18 is transferred by means of a transmission rod 24, which is arranged in a cylindrical bore 26 in the partition between the first chamber 12 and the second chamber 16, to the moving coil system 10 arranged in the second chamber 12.

The balance beam system 18 is mounted in substantially friction-free manner by means of leaf springs 29, so as to permit in this way a low-friction transmission of the torque through the balance beam system 18 between the return system 14 and the moving coil system 10. This arrangement acts to mount the transmission rod 24 outside bore 25 as a cross-spring joint. The transmission rod 24 is located in freely movable manner and with a clearance in bore 26 and in the central region of the transmission rod 24 located in the longitudinal center of the passage or cylindrical bore 26 and which is made thicker than in its regions located at the ends of bore 26, such a gap is left between the transmission rod 24 and the inner wall of bore 26 that the resulting gap connection complies with respect to the ratio of gap length to gap width to the relevant VDE standards for explosive atmosphere-protected and explosion-proof electrical production facilities (DIN EN 50018) or other corresponding standards (CSA, FM, UL, etc). This is ensured in the represented embodiment in that the balance beam system 18 has the cylindrical transmission rod 24 arranged in the long, cylindrical bore 26 passing through partition 20 and a sleeve 28 connected thereto. In the vicinity of its tilting axis, the transmission rod 24 is thickened to reduce the gap width, as was described hereinbefore.

Due to the fact that in the represented embodiment, the pressure-encapsulated first chamber 12 for receiving the moving coil system 10, i.e. the electrical assembly, the non-pressure-encapsulated second chamber 16 for receiving the return system 14, i.e. the mechanical assembly, as well as the partition 20 traversed in low-friction manner by the transmission rod 24 and arranged in freely movable manner in bore 26 are provided, in the case of a corresponding construction of the gap between transmission rod 24 and the inner wall of bore 26, it is ensured that in the case of a correspondingly large gap length and small gap width an ignition is reliably avoided. Thus, in the case of an unrestricted explosion protection, only part of a regulating device or the like has to be pressure-encapsulated.

The aforementioned transmission of a mechanical quantity by means of a transmission rod passed through a cylindrical bore or the like can also be used in other cases, where a mechanical quantity from a pressure-encapsulated chamber, e.g containing electrical components, has to be transferred into a non-pressure-encapsulated chamber or vice-versa.

The features of the invention disclosed in the description, drawings and claims, can be essential for the realization of the different embodiments of the invention, either singly or in combinations.

What is claimed is:

1. Apparatus for the transmission of mechanical motions representing measured quantities between an explosion-proof space and an explosion-hazarded space for measuring and control purposes, with electrical components subject to the action of electrical energy and with mechanical components subject to the action of mechanical energy, the combination comprising a partition for separating said explosion-endangered space from said explosionproof space, said partition having a bore with a substantially circular cross-section, a transmission rod with a substantially circular cross-section arranged in a low friction, freely movable manner within said bore to provide a breakdown-proof interconnection between said explosion-endangered space and said explosion-proof space, said electrical components being received in an explosion-proof, pressure-encapsulated first chamber having a wall at least partly formed by said partition, said mechanical components being arranged in the explosion-hazarded space and open to the ambient atmosphere and located in a second chamber, said second chamber being separated from said first chamber by said partition, wherein the transmission rod is tiltably arranged about a tilting point in the passage with the formation of a gap connection.

2. Apparatus according to claim 1, wherein said gap connection is constructed as a labyrinth.

3. Apparatus according to claim 1 or 2, wherein said transmission rod is pivotable about a tilting axis.

4. Apparatus according to claim 1, wherein the transmission rod is thinner in its regions closer to the ends of the cylindrical bore than in its middle region adjacent to the longitudinal center of the bore, which thereby provides ignition breakdown protection and substantially contains therewithin a tilting axis of the transmission rod.

5. Apparatus according to claim 4, wherein the thinner regions of the transmission rod pass into the thicker middle region via conical connecting regions which are rotationally symmetrical to the median longitudinal axis of the transmission rod.

6. Apparatus according to claim 4, wherein the tilting axis of the transmission rod is located in the longitudinal center of the passage.

7. Apparatus according to claim 4, wherein the transmission rod is mounted outside the bore by means of a cross spring joint.

* * * * *